Patented Sept. 1, 1931

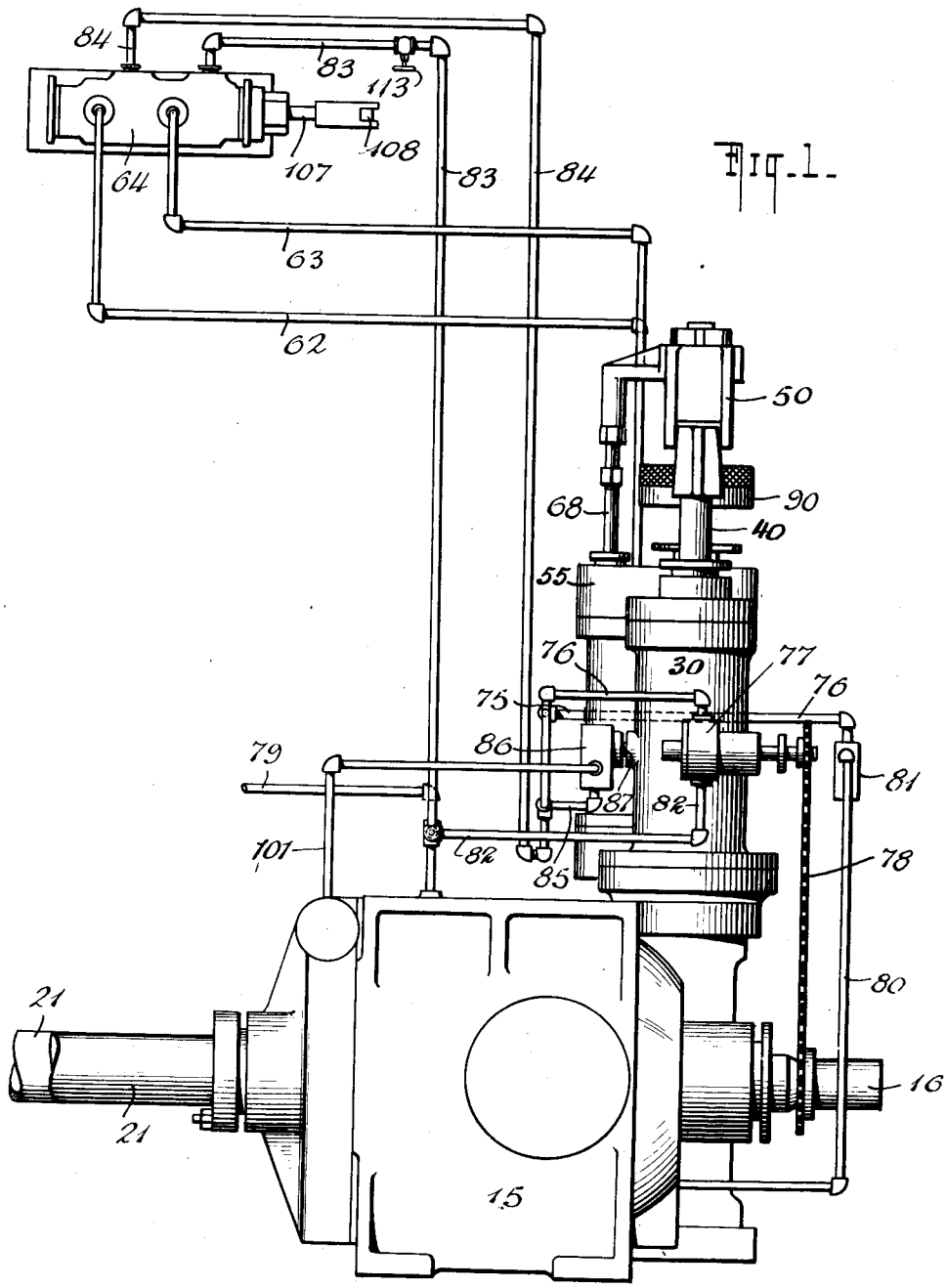

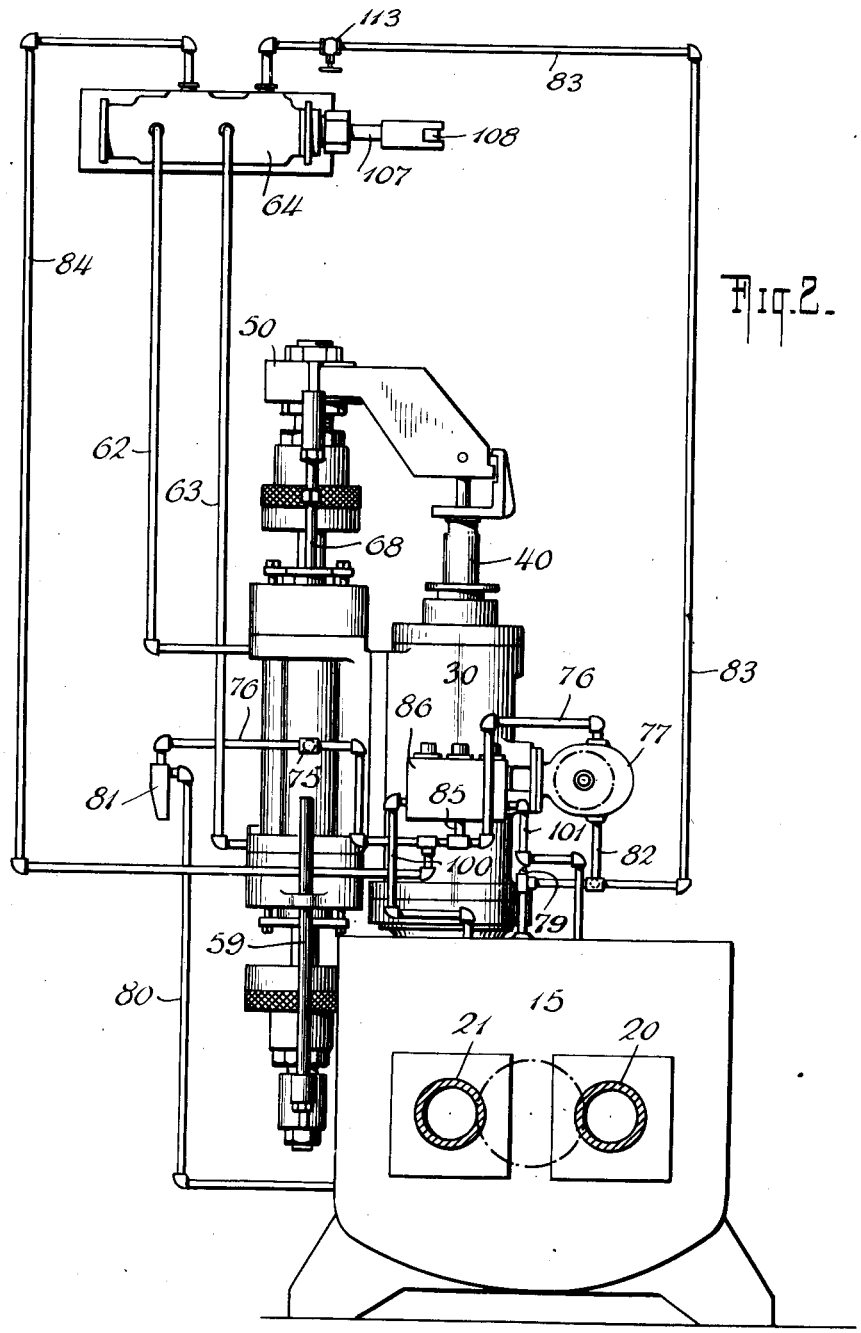

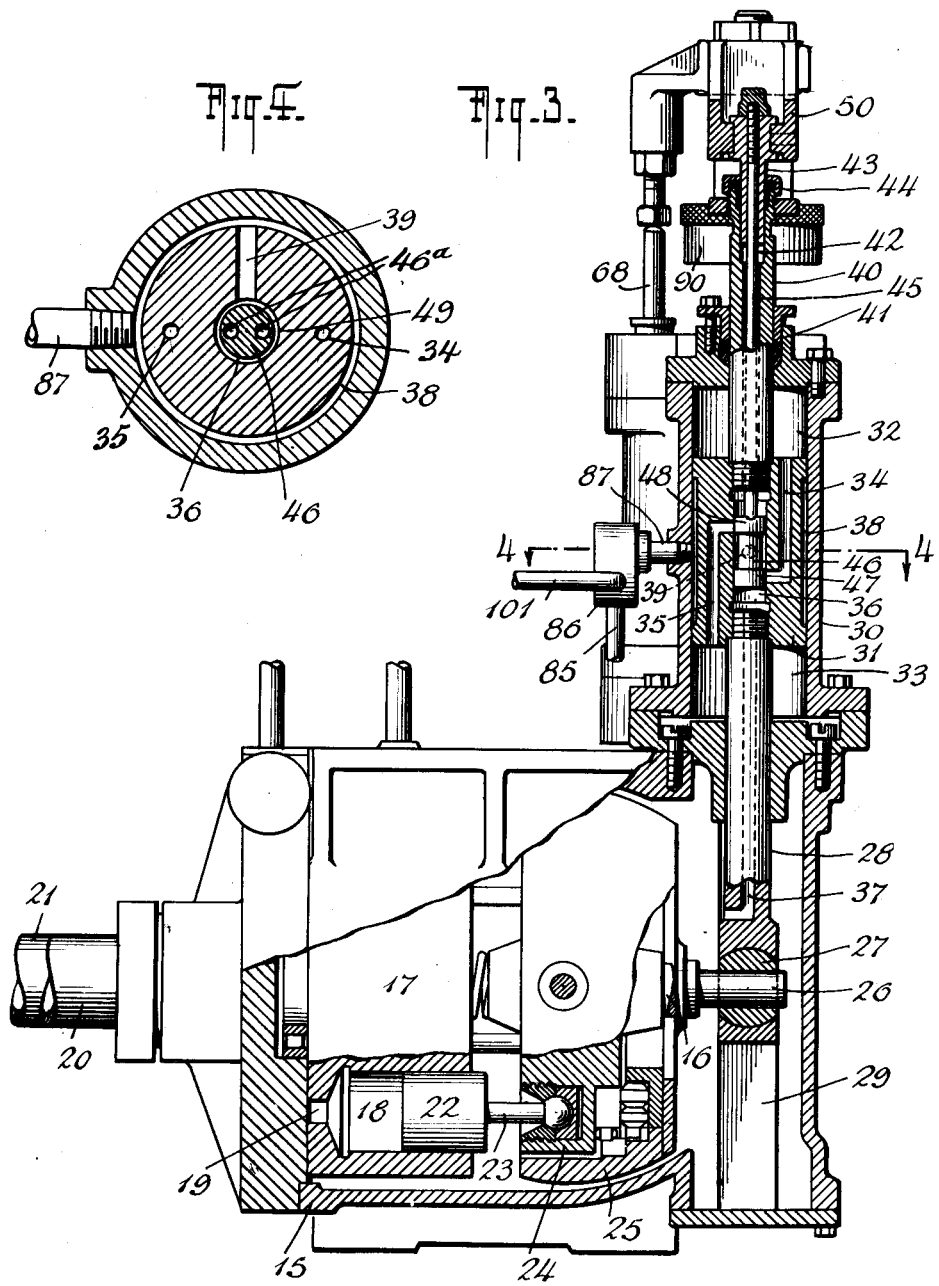

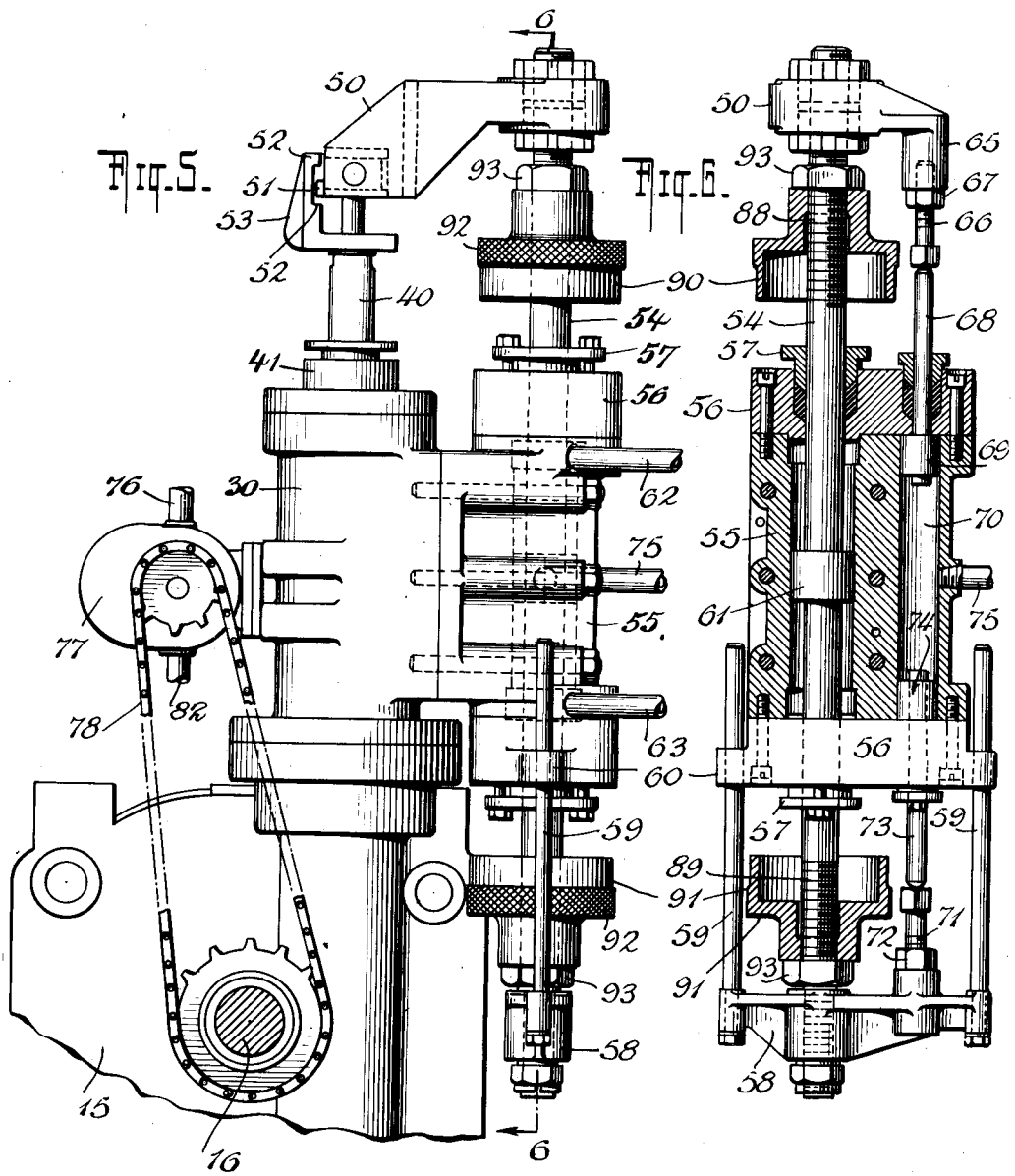

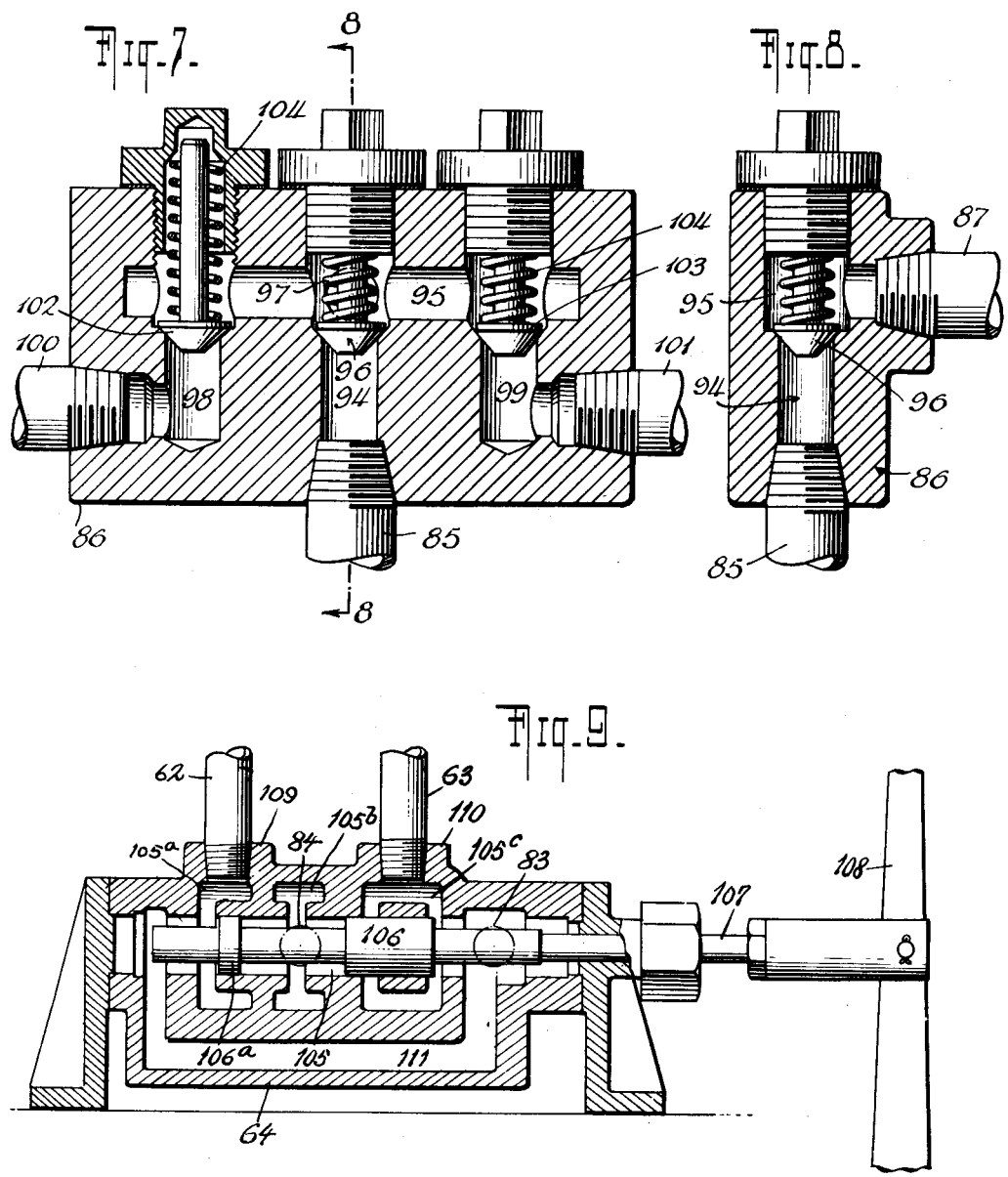

1,821,502

UNITED STATES PATENT OFFICE

ARTHUR L. ELLIS, OF NEW ROCHELLE, NEW YORK, ASSIGNOR TO THE WATERBURY TOOL COMPANY, OF WATERBURY, CONNECTICUT, A CORPORATION OF CONNECTICUT

CONTROLLING APPARATUS FOR VARIABLE SPEED TRANSMISSIONS

Application filed November 13, 1930. Serial No. 495,402.

The invention relates to variable speed transmissions and more particularly to reversible hydraulic variable speed transmissions of the well known Waterbury type which include a hydraulic pump unit in which a swash plate is adjustable to different positions to vary the output of the pump and the direction of operation thereof to correspondingly control the speed and direction of transmission. The principal object of the invention is to provide a novel and efficient controlling apparatus for such transmissions whereby the latter may be adjusted positively and accurately to the neutral position to avoid creeping of the mechanism being driven. The invention contemplates further the provision of a novel arrangement whereby the speed of the transmission unit may be predetermined in an accurate manner. Another object of the invention is to provide a controlling apparatus in which the use of high pressure gear pumps for supplying high pressure oil to actuate the control under certain operative conditions is avoided. Other more specific objects will appear from the description hereinafter, and the features of novelty will be pointed out in the claims.

In the accompanying drawings, which show an example of the invention without defining its limits, Fig. 1 is a side elevation of the pump unit of the variable speed transmission, with the novel controlling apparatus operatively combined therewith; Fig. 2 is an elevation looking at right angles to Fig. 1; Fig. 3 is a sectional elevation of the pump unit and associated elements; Fig. 4 is an enlarged fragmentary section on the line 4—4 of Fig. 3; Fig. 5 is an elevation showing elements of the controlling apparatus; Fig. 6 is a longitudinal section thereof approximately on the line 6—6 of Fig. 5; Fig. 7 is a sectional elevation of a valve arrangement forming part of the apparatus; Fig. 8 is a section thereof on the line 8—8 of Fig. 7, and Fig. 9 is a sectional elevation of a reversing valve included in said apparatus.

For purposes of description and illustration the controlling apparatus has been shown in operative combination with the pump unit of the well known Waterbury type of variable speed transmission for which it is particularly adapted. This is however not to be construed as defining the limits of the invention which obviously may be combined with equal efficiency with other types of hydraulic or equivalent transmission means.

In the drawings 15 represents the pump unit of a conventional variable speed and reversible hydraulic transmission of the well known Waterbury type, which unit is operated by any suitable power developing means such as an electric motor coupled to the drive shaft 16 in any usual way. The pump unit 15 comprises a casing in which a rotatable barrel 17 is mounted upon the shaft 16, said barrel being provided with a plurality of cylinders 18 each having a port 19 adapted to communicate, in periodic succession, with suction and pressure ports with which said pump unit 15 is provided in the customary manner. The aforesaid ports are arranged in communication with pipes 20 and 21 leading to the motor unit or its equivalent which constitutes the co-operating element of the transmission; as this motor unit or equivalent device may be of any well known type and forms no part of the present invention it has not been deemed necessary to illustrate it in the drawings.

The cylinders 18 of the barrel 17 slidably accommodate pistons 22 connected by piston rods 23 with a swash plate 24 rotatably mounted in a tilting box 25 which is suitably fixed upon the shaft 16 so as to be capable of being adjusted to different angular positions relatively thereto, in order to vary the output of the pump 15 and the direction of flow through the pipes 20 and 21, to thereby correspondingly change the speed of the transmission and its operative direction of movement. For the purpose of adjusting the position of the swash plate 24 and tilting box 25 to and from the neutral position shown in Fig. 3 and to various inclinations relatively thereto, the tilting box 25 is suitably connected with the controlling mechanism. In the illustrated example the tilting box 25 is accordingly provided with a stub-shaft 26 which fits into a rocking bearing 27 carried by a control shaft 28; the latter is vertically guided in suitable guideways 29 provided in the casing of the pump 15 and projects outwardly beyond the same as shown in Fig. 3.

In the example of the invention illustrated in the drawings, the actuation of the control shaft is effected by means of a servo-motor 30, which is mounted directly upon the casing of the pump 15, as shown in Fig. 3. The servo-motor 30 may be of any conventional type and as illustrated comprises an upright cylinder in which a piston 31 is slidably mounted and connected with one end of the control shaft 28. The piston 31 divides the cylinder of the servo-motor 30 into independent upper and lower chambers 32 and 33 respectively, and itself is formed with longitudinal conduits 34 and 35, the first of which opens to the chamber 32, while the second communicates with the chamber 33. The conduits 34 and 35 are connected by means of lateral branches with the opposite end portions of a valve chamber 36 formed in the piston 31, as shown in Fig. 3, said chamber 36, in the illustrated example, communicating with one end of a channel 37 extending longitudinally of the control shaft 28 and leading to the interior of the casing of the pump 15 in the well known way.

The piston 31 at its opposite ends slidably fits the interior of the cylinder of the servo-motor 30 in a fluid tight manner and at its intermediate portion is of reduced diameter to form an annular passageway 38 between itself and said cylinder, said passageway 38 being connected by means of a radial channel 39 with the valve chamber 36 approximately at the middle point of the latter, as illustrated in Figs. 3 and 4. A sleeve 40 is connected with and projects upwardly from the piston 31 through a suitable stuffing box 41 located at the upper end of the servo-motor cylinder and partakes of the vertical movements of said piston 31. At its upper end the sleeve 40 is provided with an internal recess 42 in which a plunger 43 is slidable, said plunger projecting outwardly beyond the recess 42 through a suitable stuffing box 44 and being secured to a valve stem 45; the latter extends downwardly through the axial bore of the sleeve 40, and at its lower end is connected with a pilot valve 46 slidably mounted in the valve chamber 36, as shown in Fig. 3. The pilot valve 46 is provided at its opposite ends with heads 47 and 48, which slidably fit the valve chamber 36 in a fluid tight manner and at its intermediate portion is of reduced diameter to form an annular passageway 49 between itself and the wall of the valve chamber 36; the heads 47 and 48 of the pilot valve 46 are dimensioned to close the lateral branches of the conduits 34 and 35 when said pilot valve occupies the normal position illustrated in Fig. 3. In addition the pilot valve 46 is provided with one or more longitudinally extending channels 46ª which establish communication between the opposite end portions of the valve chamber 36.

The valve stem 45, through the medium of the plunger 43, is connected with an upper yoke 50 provided with a stop 51 extending between and laterally beyond spaced shoulders 52 comprising parts of a stop bracket 53 carried by the sleeve 40, as shown in Fig. 5, for the purpose which will appear more clearly hereinafter. The yoke 50 is connected with the means whereby the swash plate 24 and tilting box 25 of the motor 15 are positively and accurately adjusted to the neutral position illustrated in Fig. 3. In the form shown in the drawings the means referred to comprises a main piston rod or stem 54, which extends longitudinally through and beyond a main cylinder 55, closed at its opposite ends by suitable heads or caps 56 and stuffing boxes 57, said rod or stem 54 having its upper end rigidly connected with the upper yoke 50 and its lower end similarly connected with a lower yoke 58, as illustrated in Fig. 6; for guiding purposes, the lower yoke 58 carries guide rods 59, which are vertically slidable in lugs 60 forming part of the lower head or cap 56. At an intermediate point the rod or stem 54 is provided with a piston 61 slidable in the cylinder 55 and constituting what may be termed a double acting piston. Oil or its equivalent under pressure is supplied to the cylinder 55 upon opposite sides of the piston 61 by means of pipes 62 and 63, which lead respectively to the upper and lower ends of said cylinder 55 and communicate with the interior of a reversing valve casing 64, the construction and operation of which will be more fully set forth hereinafter.

The upper yoke 50 is provided with an extension 65, from which a stud or screw 66 depends, said stud preferably being in the form of a threaded bolt screwed into the extension 65, so as to be adjustable relatively thereto, a lock nut 67 or its equivalent being provided for fixing said stud 66 in an adjusted position. The head of the stud 66 bears against the independent piston rod 68 of a piston 69, slidably mounted in an auxiliary cylinder 70. A similar stud 71 projects upwardly from and is adjustably mounted upon the lower yoke 58 and is secured in an adjusted position thereon by means of a lock nut 72 or its equivalent, and with its head bears against the independent piston rod 73 of a second relatively small piston 74, also slidable in said auxiliary cylinder 70. With this arrangement the connections between the piston 69 and the yoke 50 and the piston 74 and yoke 58 are of an impositive nature, so that the pistons 69 and 74 are capable of independent movement in the cylinder 70 and constitute centering pistons for the purpose to be more fully explained hereinafter. Oil or its equivalent under pressure is supplied to the cylinder 70 through a pipe 75, which communicates with said cylinder approximately midway between the opposite ends thereof, so that the oil or other pressure medium in the cylinder 70 is effective upon the pistons 69 and 74 in opposite directions, as will appear more fully hereinafter. The pipe 75 leads to a pipe 76 which, in turn is connected with a relatively small gear pump 77, which, in the illustrated example, is driven from the driving shaft 16 of the hydraulic motor 15 by means of a sprocket chain or belt drive 78, as shown in Fig. 1. The pump 77 receives its oil or equivalent fluid through a pipe 79, which is connected to an expansion tank containing a supply of such fluid and preferably located at the highest point of the system; as the oil for the pump 77 may be supplied from any suitable source, it has not been deemed necessary to include the expansion tank in the drawings. The pipe 76 further communicates with a pipe 80 which leads to the hydraulic pump 15, a relief valve 81 of any suitable construction being located in the pipe line 76—80 at a suitable point, for instance, as indicated in Fig. 2. The pump 77 in addition is connected by means of a branch pipe 82 with a pipe 83, which leads to one port of the reversing valve casing 64, another port of which is connected by means of a pipe 84 with the pipe 76, which leads to said pump 77 so that the inlet and outlet ports of the latter are both in communication with said reversing valve casing 64. The pump 77 serves furthermore to supply fluid under pressure for actuating the servo-motor 30, and accordingly has its pipe 76 in communication with a branch 85 leading to a check valve 86, the construction and operation of which will be more fully described hereinafter, said check valve 86 in turn being connected with the cylinder of the servo-motor 30 by means of a branch 87 at a point approximately midway between the ends of said cylinder, as shown in Fig. 3.

As shown in Figs. 5 and 6, the rod 54 is provided at its opposite end portions with screwthreaded sections 88 and 89 for the reception of recessed stop collars 90 and 91, provided with knurled peripheries 92 to facilitate the adjustment of said stop collars 90 and 91 on the aforesaid rod 54; lock nuts or their equivalent 93 are provided for fixing the collars 90 and 91 in their adjusted positions on the rod 54. The stop collars 90 and 91, by engagement with the cylinder closures 56 at opposite ends of the cylinder 55, determine the extent of movement of the piston 61 in opposite directions for the purpose to be more clearly set forth hereinafter.

The construction and arrangement of the check valve 86 is clearly illustrated in Figs. 7 and 8. As shown in these figures, said check valve comprises a casing provided with a channel 94 communicating with the branch 85 and leading to an internal chamber 95 with which the branch 87 is connected; a valve 96, under the influence of a relatively light spring 97, controls the communication between the passage 94 and the chamber 95, and accordingly between the branches 85 and 87. The chamber 95 further is connected with channels 98 and 99 formed in the casing of the check valve 86, said channels 98 and 99 being connected by means of pipes 100 and 101 respectively, with the casing of the pump 15, that is, with each side of the high pressure system, respectively. The communication between the channels 98 and 99, and the chamber 95 are controlled by check valves 102 and 103, which are individually under the influence of springs 104, as shown in Fig. 7.

The reversing valve casing 64 may be of any suitable construction, and as shown in Fig. 9, may include a valve passage 105 communicating with chambers 105$^a$, 105$^b$ and 105$^c$, and in which a compound reversing slide valve 106—106$^a$ is slidably mounted, said slide valve being connected by means of a rod 107 with means, for instance, in the form of a lever 108 for manually actuating said reversing valve 106—106$^a$. The chambers 105$^a$ and 105$^c$ communicate with ports 109 and 110 leading to the pipes 62 and 63, the valve casing 64 being provided with additional ports leading to the pipes 83 and 84, and with a channel 111 whereby the chamber 105$^a$ is connected with the pipe 83, as shown in Fig. 9. In order to vary the speed of response of the control means to the action of the reversing valve 106—106$^a$ a choke valve 113 may be located at a suitable point in the pipe 84. In the position shown in Fig. 9 both pipes 62 and 63 are connected to the return pipe 83 so that the pipes 62 and 63 and consequently both sides of the piston 61 are under no pressure.

During any given work period the hydraulic pump 15 will be continuously operated by the electric motor or equivalent power developing means, which is operatively connected with the driving shaft 16. As long as the parts of the motor 15 occupy the position illustrated in Fig. 3, in which the swash plate 24 and tilting box 25 are in the neutral position, the pump 15 will deliver no fluid under pressure and consequently no pressure fluid will pass through the pipes 20 and 21, with the result that the hydraulic motor or other co-operating element of the transmission will be stationary. During such work period, oil or other fluid under pressure is being supplied continuously by the pump 77 through the pipe 76 and branch 75 to the interior of the auxiliary cylinder 70. The internal pressure thus developed within said auxiliary cylinder 70 is effective upon the centering pistons 69 and 74, which consequently are moved to their outermost positions indicated in Fig. 6 and thereby center the double acting piston 61 in the main cylinder 55, which central position of the piston 61 corresponds to the neutral position of the swash plate 24 and tilting box 25. In this adjustment of the aforesaid double acting piston 61 the pilot valve 46 will occupy the position indicated in Fig. 3, in which the lateral branches of the conduits 34 and 35 are closed thereby so that the piston 31 of the servo-motor 30 is at rest. If operation of the transmission is desired, the lever 108 is actuated to shift the reversing valve 106—106ª in the casing 64 in one direction or the other to thereby admit fluid under pressure to either the upper or lower end of the main cylinder 55. If, for instance, the adjustment of the valve 106—106ª is such that pressure fluid is supplied through the pipe 63 to the lower end of the main cylinder 55, an upward pressure is developed in said main cylinder 55, which is effective from below upon the double acting piston 61, and accordingly raises the same in the cylinder 55. Because of the fact that the area of the double acting piston 61 against which developed pressures in the cylinder 55 are effective, is greater than the area of the centering pistons 69 and 74, the upward pressure exerted on the piston 61 will be sufficient to overcome the resisting pressure in the cylinder 70 and accordingly will move the centering piston 74 upwardly therein. The upward movement of the double acting piston 61 is transmitted to the centering piston 74 by means of the rod 54, lower yoke 58, stud 71 and rod 73. The upward movement of the double acting piston 61 will also move the upper yoke 50 upwardly and will correspondingly move the stud 66, which because of its impositive connection with the rod 68 travels away from the end thereof without transmitting any upward pull to the centering piston 69, so that the latter remains undisturbed in its outermost position illustrated in Fig. 6.

The upward movement imparted to the upper yoke 50 will be transmitted to the plunger 43 and valve stem 45, and accordingly will shift the pilot valve 46 upwardly in the valve chamber 36 and thereby bring the lateral branch of the conduit 35 into communication with the passage 49, and thereby permit pressure fluid supplied by the pump 77, through the branch pipe 87 to the annular passageway 38 and radial channel 39 to pass to the chamber 33 and exert an upward pressure on the servo motor piston 31, and cause the same to travel upwardly in the cylinder or casing of the servo-motor 30. As this upward movement of the piston 31 takes place the pressure fluid in the chamber 32 above said piston will flow downwardly through the conduit 34 to the lower end of the valve chamber 36 from which said fluid passes through the channel 37 to the interior of the casing of the pump 15. During the aforesaid operations, the stop collar 91 will be carried upwardly with the rod 54 and finally will engage the lower head 56 of the cylinder 55 and thereby arrest the further operation of the parts in an upward direction. If the position of the stop collar 91 with respect to the lower head 56 is such that in the normal position of the parts the distance between the lower head 56 and said stop collar 91 is less than the distance between the head 47 of the pilot valve 46 and the upper end of the valve chamber 36, this stoppage will occur before said pilot valve reaches its uppermost position in the valve chamber 36, so that the upward movement of the piston 31 of the servo-motor will be comparatively slight. This is due to the fact that the aforesaid upward movement of the servo-motor piston 31 is relative to the pilot valve 46, and that said piston 31 accordingly catches up with the pilot valve 46 and causes the lateral branch of the conduit 35 to be again closed by the head 48 of said pilot valve 46 and thereby cut off the supply of pressure fluid to the chamber 33. If, however, the adjustment of the stop sleeve 91 is, for instance, as indicated in Fig. 6, the upward movement of the pilot valve 46, under the influence of the double acting piston 61 and its associated elements, will finally cause the head 48 of the pilot valve 46 to engage the upper end of the valve chamber 46 after which the piston 61 and its associated elements continue to exert a lifting action upon the pilot valve 46 whereby the latter moves upwardly with the servo-motor piston 31, which causes the conduit 35 to remain open to the passage of pressure fluid to the chamber 33 for a longer period so that the piston 31 will be given an upward movement of relatively greater extent. This greater upward movement of the piston 31 continues until the lower stop collar 91 engages the lower head 56 of the cylinder 55 whereupon the upward movement of the double acting piston 61 and consequently of the pilot valve 46 is arrested. When this condition is reached the servo-motor piston 31 will move upward relatively to the pilot valve 46 until the lateral branch of the conduit 35 reaches and is closed by the head 48 of said pilot valve to thereby cut off the supply of pressure fluid to the chamber 33. When this happens the movement of the servo-motor piston 31 stops. In any case, the upward movement of the servo-motor piston 31 will be transmitted to the control shaft 28 and will cause the latter to rock the tilting box 25 upon its pivot to thereby adjust the swash plate to an inclined position relatively to the shaft 16, which causes the pump 15 to deliver pressure fluid from the pipes 20, 21 and accordingly brings about an operation of the hydraulic motor or equivalent co-operation element of the transmission. Similarly, if the operation of the valve 106—106ª is such as to cause pressure fluid to be delivered through the pipe 62 to the upper end of the main cylinder 55, the double acting valve 61 will be moved downwardly therein and the centering valve 69 will be correspondingly moved in the auxiliary cylinder 70 until the stop collar 90 engages the uppermost head 56 of the cylinder 55. During this downward movement of the piston 61, the yoke 50 will correspondingly adjust the pilot valve 46 downwardly in the valve chamber 36 so as to bring the lateral branch of the conduit 34 into communication with the radial channel 39, annular chamber 38 and branch pipe 87 and thereby permit fluid under pressure to pass to the upper chamber 32 and become effective upon the upper end of the servo-motor piston 31. The latter is thus forced downwardly and serves to adjust the tilting box 25 and swash plate 24 to an inclination relatively to the shaft 16 in the opposite direction. The explanation with regard to the extent of movement of the parts in an upward direction applies also to the operation of the elements in a downward direction and accordingly need not be repeated. As the piston 31 moves downwardly the pressure fluid in the chamber 33 will be forced up through the conduit 35 to the upper end of the valve chamber 36; from this point said fluid flows downwardly through the channels 46ª of the pilot valve 46 and through the channel 37 to the interior of the casing of the pump 15.

From the above it will be understood that the vertical operations of the piston 31 of the servo-motor 30 may be made, dependent upon the settings of the stop collars 90 and 91 and continue until the ends of the lateral branches of the conduits 34 and 35 dependent upon the direction of movement, arrive in registry respectively with the heads 47 and 48 of the pilot valve 46, so as to be closed thereby, as indicated in Fig. 3. In this relationship of the parts, access of the pressure fluid to the chambers 32 and 33 of the servo-motor 30 is cut off by the pilot valve, and the operation of the piston 31 consequently is arrested whenever this condition is reached.

The angle and direction of inclination of the swash plate 24 determines the amount and direction of delivery of the oil or other pressure fluid through the pipes 20 and 21, and accordingly determines the speed and direction of operation of the hydraulic motor or equivalent co-operating element of the transmission. In either case, by adjusting the choke valve 113, the speed of response of the servo-motor and its associated elements to the actuation of the valve 106—106ª may be adjusted to accurately meet the requirements as they may exist.

When it is desired to stop the operation of the transmission, the lever 108 is actuated to adjust the valve 106 back to the position shown in Fig. 9 in which as previously stated the pipes 62 and 63 leading to the main cylinder 55, that is, to opposite ends thereof, are under no pressure. As soon as this occurs, the double acting valve 61 is relieved and the fluid pressure, which is continuously effective in the auxiliary cylinder 70, acts to restore the centering pistons 69 and 74, or one of them, to the position shown in Fig. 6 to thereby automatically restore the double acting piston 61 to its mid or normal position in the cylinder 55. This restoration of the piston 61 to said mid position will be communicated to the pilot valve 46 and will bring about an operation of the servo-motor piston 31, which will positively and accurately return the tilting box 25 and swash plate 24 to the neutral position illustrated in Fig. 3, in which the hydraulic pump 15 no longer delivers fluid under pressure, whereby the operation of the hydraulic motor or equivalent element of the transmission will be arrested.

Inasmuch as the vertical movements of the double acting piston 61 determine the adjustment of the pilot valve 46 and the operative movements of the servo-motor piston 31, which controls the adjustment of the hydraulic pump 15 and consequently the speed and direction of movement of the transmission, it will be obvious that the stop collars 90 and 91 may be adjusted on the rod 54 to accurately and automatically predetermine the maximum or any given speed of operation of the hydraulic transmission in either direction.

By providing the arrangement in which the double acting piston 61 and its cylinder 55 constitute hydraulic means which control the operation of the servo-motor and consequently the setting of the transmission, the reversing valve 64 may be located in any convenient place and may be positioned at some distance from the transmission to constitute a remote control therefor.

The illustrated form of the invention includes an additional feature, which is of importance and increases the efficiency of the mechanism as a whole. The pump 77 which may, for instance, be a gear pump, operates in the preferred arrangement to produce oil or other fluid at relatively low pressure, which is sufficient to operate the double centering pistons 69 and 74, and the double acting piston 61 and normally is great enough to operate the servo-motor 31 in the desired manner. However, in practice, the amount of work required to be done by the servo-motor 31 increases as the oil pressure delivered by the hydraulic pump 15 increases, so that ordinarily it would be necessary to make the pump 77 or its equivalent produce a pressure sufficiently high to take care of the maximum operating conditions required in said servo-motor. Obviously, such an arrangement carries with it a material wastage of oil when the maximum pressures for which the mechanism is designed are not required in its operation. To avoid this objection, the check valve arrangement shown in Figs. 7 and 8 is provided. Under operative conditions, when the relatively low pressure provided by the pump 77 is sufficient for the operation of the servo-motor 30, enough pressure oil or its equivalent, and no more, will pass from the pump 77, through the pipe 76 and branch 85 into the channel 94 and will lift the check valve 96 from its seat against the tension of the spring 97. The oil or other pressure fluid under such conditions will pass to the internal chamber 95 and through the branch 87 to the annular chamber 38 of the servo motor 30. When, however, the oil pressure in the transmission, that is, in the hydraulic motor 15 rises above the pressure for which the gear pump 77 or its equivalent 77 is set, relatively high pressure oil or other fluid from such motor 15 or its equivalent will pass through either of the pipes 100 or 101 into either of the channels 98 or 99 and will raise either the check valve 102 or check valve 103 from the co-operating seat against the tension of one of the springs 104. This higher pressure oil will then pass into the chamber 95 and accordingly will exert a pressure upon the check valve 96 tending to close the same against its seat, and will flow through the branch 87 into the annular chamber 38 of the servo motor 30 to become effective upon the piston 31 therein, in accordance with the setting of the pilot valve 46. The operation of the servo-motor is thus automatically brought into accord with the pressure conditions developed in the transmission and with the operative requirements which said servo-motor is forced to meet, and therefore avoids any waste of oil or equivalent pressure fluid.

By providing the centering pistons 69 and 74 the servo motor 30 and the tilting box 25 and swash plate 24 are positively and accurately brought to a neutral position in an automatic manner each time the operation of the transmission ceases. This does away with the possibility that the swash plate may be left in a position slightly inclined relatively to the driving shaft 16, which would result in developing a creep in the mechanism being driven, which at all times is undesirable and in some instances may even be extremely dangerous. The novel arrangement also provides a controlling means whereby the adjustment of the hydraulic transmission to produce different speeds and direction of movement may be accomplished with a minimum of manual effort.

By using a gear pump 77 or equivalent pressure developing means, operating at from 150 to 200 lbs. pressure as a maximum, the minimum amount of oil or equivalent pressure fluid is utilized to operate the controlling mechanism under normal conditions, while the provision of the check valve arrangement shown in Figs. 7 and 8 makes available the high pressure oil or equivalent fluid necessary to operate the servo-motor when the oil pressure in the main system rises to from 700 to 800 lbs. A very much quicker response to the servo motor and much more economical and efficient operating conditions are thus secured than if only the supply from the gear pump 77 or its equivalent were used under all conditions of pressure developed in the transmission.

The novel controlling means is capable of being utilized in all hydraulic transmissions systems in which a servo motor or equivalent device is required for the purpose of adjusting the means whereby the developed operation of the transmission is determined.

Various changes in the specific forms shown and described may be made within the scope of the claims without departing from the spirit of the invention.

I claim:—

1. The combination of a hydraulic variable speed transmission including adjusting means whereby the operation of the transmission is determined, operating means for actuating said adjusting means to vary said operation, and controlling means whereby said operating means is actuated to positively and accurately restore said adjusting means to its neutral position.

2. The combination of a hydraulic variable speed transmission including adjusting means whereby the operation of the transmission is determined, fluid pressure actuated operating means for actuating said adjusting means to vary said operation, and fluid pressure actuated controlling means whereby said operating means is actuated to positively and accurately restore said adjusting means to its neutral position.

3. The combination of a hydraulic variable speed transmission including adjusting means whereby the operation of the transmission is determined, operating means for actuating said adjusting means to vary said operation, a fluid pressure actuated main device for actuating said operating means, and a fluid actuated auxiliary device for automatically operating said main device to positively and accurately restore said adjusting means to its neutral position.

4. The combination of a hydraulic variable speed transmission including adjusting means whereby the operation of the transmission is determined, operating means for actuating said adjusting means to vary said operation, a fluid pressure actuated main device for actuating said operating means, a fluid actuated auxiliary device for automatically operating said main device to positively and accurately restore said adjusting means to its neutral position, pressure developing means for supplying fluid under pressure to said devices, and means for selectively controlling the admission of the pressure fluid to said main device.

5. The combination of a hydraulic variable speed transmission including adjusting means whereby the operation of the transmission is determined, operating means for actuating said adjusting means to vary said operation, a fluid pressure actuated main device for actuating said operating means, a fluid actuated auxiliary device for automatically operating said main device to positively and accurately restore said adjusting means to its neutral position, pressure developing means for supplying fluid under pressure to said devices, said pressure developing means being common to both of said devices and being in constant open communication with said auxiliary device, and means for selectively controlling the admission of the pressure fluid to said main device.

6. The combination of a hydraulic variable speed transmission including an angularly adjustable swash plate whereby the operation of said transmission is controlled, a servo-motor for adjusting said swash plate to vary said operation of the transmission, a main cylinder, a double acting piston reciprocable in said cylinder and connected with said servo-motor to control the operation thereof, an auxiliary cylinder, centering pistons reciprocable in said auxiliary cylinder and connected with said double acting piston, pressure developing means for supplying fluid under pressure to said cylinders to automatically operate said centering pistons to adjust said double acting piston to its normal position whereby said servo-motor is caused to positively and accurately adjust said swash plate to its neutral position, and means for selectively controlling the admission of pressure fluid to said main cylinder to actuate said double acting piston whereby said servo-motor is caused to adjust said swash plate to an angular operative position.

7. The combination of a hydraulic variable speed transmission including adjusting means whereby the operation of the transmission is determined, operating means for actuating said adjusting means to vary said operation, a fluid pressure actuated main device for actuating said operating means, a fluid actuated auxiliary device for automatically operating said main device to positively and accurately restore said adjusting means to its neutral position, pressure developing means for supplying fluid under pressure to said devices, and means for selectively controlling the admission of the pressure fluid to said main device, and means adjustably connected with said main device for arresting the operation thereof to predetermine the extent of operation of said adjusting means.

8. The combination of a hydraulic variable speed transmission including an angularly adjustable swash plate whereby the operation of said transmission is controlled, a servo-motor for adjusting said swash plate to vary said operation of the transmission, a main cylinder, a double acting piston reciprocable in said cylinder and connected with said servo-motor to control the operation thereof, an auxiliary cylinder, centering pistons reciprocable in said auxiliary cylinder and connected with said double acting piston, a fluid pressure pump, connections from said pump to opposite ends of said main cylinder, a reversing valve in said connections whereby pressure fluid is selectively supplied to said main cylinder to control the operation of the double acting piston therein, and a constantly open connection from said pump to said auxiliary cylinder to supply thereto a fluid pressure which is constantly effective on said centering pistons to adjust said double acting piston to its normal position whereby said servo-motor is automatically caused to positively and accurately restore said swash plate to its neutral position.

9. The combination of a hydraulic variable speed transmission including an angularly adjustable swash plate whereby the operation of said transmission is controlled, a servo-motor for adjusting said swash plate to vary said operation of the transmission, a main cylinder, a double acting piston reciprocable in said cylinder and connected with said servo-motor to control the operation thereof, an auxiliary cylinder, centering pistons reciprocable in said auxiliary cylinder and connected with said double acting piston, a fluid pressure pump, connections from said pump to opposite ends of said main cylinder, a reversing valve in said connections whereby pressure fluid is selectively supplied to said main cylinder to control the operation of the double acting piston therein, a choke valve in said connection for varying the speed of response of said double acting piston and servo-motor to an operation of said reversing valve, and a constantly open connection from said pump to said auxiliary cylinder to supply thereto a fluid pressure which is constantly effective on said centering pistons to adjust said double acting piston to its normal position whereby said servo-motor is automatically caused to positively and accurately restore said swash plate to its neutral position.

10. The combination of a hydraulic variable speed transmission including an angularly adjustable swash plate whereby the operation of said transmission is controlled, a servo-motor for adjusting said swash plate to vary said operation of the transmission, a main cylinder, a main piston rod extending lengthwise of said main cylinder and outwardly beyond opposite ends thereof, a double acting piston at an intermediate point of said rod reciprocable in said main cylinder, an upper yoke at one end of said piston rod connected with said servo-motor whereby the latter is controlled by said double acting piston, an auxiliary cylinder, centering pistons reciprocable therein, independent piston rods projecting from said centering pistons in opposite directions outwardly beyond said auxiliary piston, a lower yoke carried by said main piston rod at its opposite ends, studs adjustably mounted upon said yokes and arranged to engage said independent piston rods whereby the movements of said centering pistons are communicated to said main piston rod and double acting piston, a fluid pressure pump, connections from said pump to opposite ends of said main cylinder, a reversing valve in said connections whereby pressure fluid is selectively supplied to said opposite ends of the main cylinder to control the operation of the double acting piston therein, a constantly open connection from said pump to said auxiliary cylinder to supply thereto a fluid pressure which is constantly effective on said centering pistons to adjust said double acting piston to its normal position whereby said servo-motor is automatically caused to positively and accurately restore said swash plate to its neutral position, and stop collars adjustably carried by said main piston rod for engagement with opposite ends of said main cylinder whereby the reciprocative movements of said double acting piston are arrested to predetermine the operation of said servo-motor and the adjustment thereby of said swash plate.

11. The combination of a hydraulic variable speed transmission including adjusting means whereby the operation of said transmission is determined, fluid pressure actuated operating means for actuating said adjusting means to vary said operation, a cylinder, a double acting piston reciprocable in said cylinder and connected with said operating means whereby the latter is operated to control said adjusting means, means for supplying fluid under pressure to opposite ends of said cylinder, and means whereby said pressure fluid is selectively conducted to one or the other end of said cylinder.

12. The combination of a hydraulic variable speed transmission including an angularly adjustable swash plate whereby the operation of said transmission is controlled, a servo-motor for adjusting said swash plate to vary said operation of the transmission, a cylinder, a double acting piston reciprocable in said clylinder and connected with said servo-motor to control the operation thereof, means for supplying fluid under pressure to opposite ends of said cylinder, and a reversing valve whereby said pressure fluid is selectively supplied to one or the other end of said cylinder.

13. The combination of a hydraulic variable speed transmission including an angularly adjustable swash plate whereby the operation of said transmission is controlled, a servo-motor for adjusting said swash plate to vary said operation of the transmission, a cylinder, a piston rod extending lengthwise of said cylinder and outwardly beyond the opposite ends thereof, a double acting piston at an intermediate point of said rod reciprocable in said cylinder, a connection from said piston rod to said servo-motor whereby the latter is controlled by said double acting piston, a fluid pressure pump for supplying pressure fluid to opposite ends of said cylinder, a reversing valve whereby the pressure fluid from said pump is selectively supplied to one or the other end of said cylinder, and stop collars adjustably carried by said piston rod for engagement with opposite ends of said cylinder to arrest the reciprocative movements of said double acting valve whereby the operation of said servo-motor and the adjustment thereby of said swash plate are predetermined.

14. The combination of a hydraulic variable speed transmission including adjusting means whereby the operation of said transmission is determined, fluid pressure actuated operating means for actuating said adjusting means to vary said operation, a cylinder, a double acting piston reciprocable in said cylinder and connected with said operating means whereby the latter is operated to control said adjusting means, means for supplying fluid under pressure to opposite ends of said cylinder to operate said double acting piston, an auxiliary cylinder open to fluid pressure, centering pistons reciprocable in said auxiliary cylinder and connected with said double acting piston to automatically adjust the same to its normal position whereby said adjusting means is positively and accurately restored to its neutral position, and adjustable means for varying the operative movements of said centering pistons to accord with said normal position of said double acting piston.

15. The combination of a hydraulic variable speed transmission including an angularly adjustable swash plate whereby the operation of said transmission is controlled, a servo-motor for adjusting said swash plate to vary said operation of the transmission, a cylinder, a piston rod extending lengthwise of said cylinder and outwardly beyond the opposite ends thereof, a double acting piston at an intermediate point of said rod reciprocable in said cylinder, a connection from said piston rod to said servo-motor whereby the latter is controlled by said double acting piston, an auxiliary cylinder open to fluid pressure, centering pistons reciprocable in said auxiliary cylinder whereby said double acting piston is automatically adjusted to its normal position to thereby cause said servo-motor to positively and accurately restore said swash plate to its neutral position, adjustable studs movable with said piston rod for varying the operative movements of said centering pistons to accord with said normal position of the double acting piston, means adjustably connected with said piston rod for arresting the reciprocative movements of said double acting piston whereby the operation of said servo-motor and the adjustment thereby of said swash plate are predetermined, and means for supplying fluid under pressure to said two cylinders.

16. The combination of a hydraulic variable speed transmission including adjusting means whereby the operation of the transmission is determined, operating means actuated by fluid pressure for operating said adjusting means to vary said operation, means whereby fluid at relatively low pressure is supplied to said operating means, and means whereby said low pressure means is automatically disconnected from said operating means and whereby the latter is automatically supplied with high pressure fluid directly from said transmission in accordance with predetermined operative requirements.

17. The combination of a hydraulic variable speed transmission including an angularly adjustable swash plate whereby the operation of said transmission is controlled, a servo-motor for adjusting said swash plate to vary said operation of the transmission, a low pressure fluid pump connected with said servo-motor for supplying fluid at low pressure thereto, and means in said connection and connected with said transmission whereby communication between said pump and servo-motor is automatically cut off and communication between the latter and said transmission is established to supply high pressure fluid to said servo-motor in accordance with developed increased pressure conditions in said transmission.

18. The combination of a hydraulic variable speed transmission including an angularly adjustable swash plate whereby the operation of said transmission is controlled, a servo-motor for adjusting said swash plate to vary said operation of the transmission, a low pressure fluid pump, a check valve casing connected with said pump and said servo-motor, connections from said check valve casing to said transmission, a check valve controlling the connection between said casing and pump whereby low pressure fluid is normally supplied to said servo-motor, and additional check valves controlling the connections with said transmission whereby high pressure fluid is supplied to said servo-motor in accordance with predetermined increased pressure conditions developed in said transmission, and said low pressure connection with said pump is cut off from said servo-motor.

19. The combination of a hydraulic variable speed transmission including an angularly adjustable swash plate whereby the operation of said transmission is controlled, a servo-motor for adjusting said swash plate to vary said operation of the transmission, a main cylinder, a double acting piston reciprocable in said cylinder and connected with said servo-motor to control the operation thereof, an auxiliary cylinder, centering pistons reciprocable in said auxiliary cylinder and connected with said double acting piston, a low pressure pump, a constantly open connection between said pump and said auxiliary cylinder, connections between said pump and opposite ends of said main cylinder, a reversing valve in said last named connections for selectively controlling the admission of pressure fluid to said opposite ends of said cylinder, a check valve casing connected with said servo-motor, a connection leading from said casing to said low pressure pump, a check valve in said casing controlling said last named connection whereby low pressure fluid is normally supplied to said servo-motor, connections from said casing to said transmission, and additional check valves in said last named connections whereby high pressure fluid is supplied to said servo-motor in accordance with predetermined increased pressure conditions developed in said transmission, and said low pressure connection with said pump is cut off from said servo-motor.

In testimony whereof I have hereunto set my hand.

ARTHUR L. ELLIS.